United States Patent [19]
Griswold et al.

[11] Patent Number: 5,318,341
[45] Date of Patent: Jun. 7, 1994

[54] VEHICLE SEAT ASSEMBLY WITH STRUCTURAL SEAT BACK TO ACCOMMODATE SEAT BELT LOADS APPLIED TO SEAT BACK

[75] Inventors: Les Griswold, Ann Arbor; Marc D. Hewko, Canton; Robert D. Elton; Paul M. Grippo, both of Ann Arbor, all of Mich.; John Krieger, Dublin, Ohio

[73] Assignee: Hoover Universal, Inc., Plymouth, Mich.

[21] Appl. No.: 826,858

[22] Filed: Jan. 28, 1991

Related U.S. Application Data

[63] Continuation-in-part of Ser. No. 659,500, Feb. 22, 1991.

[51] Int. Cl.$^5$ .............................................. B60N 2/22
[52] U.S. Cl. ........................ 297/362.11; 297/216.13; 297/284.4; 297/452.18; 297/483
[58] Field of Search ............... 297/216, 285 C, 348, 297/345, 346, 338, 130, 483, 475, 452, 460; 297/284.4, 379, 361, 362

[56] References Cited

U.S. PATENT DOCUMENTS

| | | |
|---|---|---|
| 1,788,088 | 1/1931 | Fabio . |
| 3,583,764 | 6/1971 | Lohr . |
| 3,663,057 | 5/1972 | Lohr et al. . |
| 3,761,127 | 9/1973 | Giese et al. . |
| 3,917,211 | 11/1975 | Daunderer et al. . |
| 4,192,545 | 3/1980 | Higuchi et al. ...................... 297/216 |
| 4,218,091 | 8/1980 | Webster .............................. 297/361 |
| 4,515,339 | 5/1985 | Kluting et al. . |
| 4,579,386 | 4/1986 | Rupp et al. ......................... 297/361 |
| 4,725,095 | 2/1988 | Benson et al. . |
| 4,726,617 | 2/1988 | Nishimura .......................... 297/473 |
| 4,781,354 | 11/1988 | Nihei et al. ......................... 297/379 |
| 4,886,316 | 12/1989 | Suzuyome et al. ............... 297/284.4 |
| 4,887,864 | 12/1989 | Ashton . |
| 4,889,389 | 12/1989 | White . |
| 4,940,285 | 7/1990 | Suzuki et al. ....................... 297/473 |
| 5,014,958 | 5/1991 | Harney ........................... 297/346 X |

FOREIGN PATENT DOCUMENTS 143144  7/1985  Japan ................. 297/284.4

Primary Examiner—Peter R. Brown
Attorney, Agent, or Firm—Harness, Dickey & Pierce

[57] ABSTRACT

A vehicle seat assembly with a structural seat back to accommodate the seat belt loads applied to the seat back by a belt system which is carried by the seat assembly. The seat back includes a reinforced beam along one side to accommodate these loads with a recliner mechanism along the same side of the seat assembly coupled to the reinforced member to resist forward rotation of the seat back caused by seat belt loads applied thereto. The seat assembly is configured to be as similar to conventional seat assemblies as possible to minimize the need to redesign the non-structural components of the seat assembly. The seat assembly includes many features found in current production seat assemblies such as a fore and aft adjuster, an adjustable lumbar support, a seat cushion lift mechanism and a seat back recliner. The seat belt loads have been efficiently managed to avoiding adding unnecessary structure and weight.

17 Claims, 8 Drawing Sheets

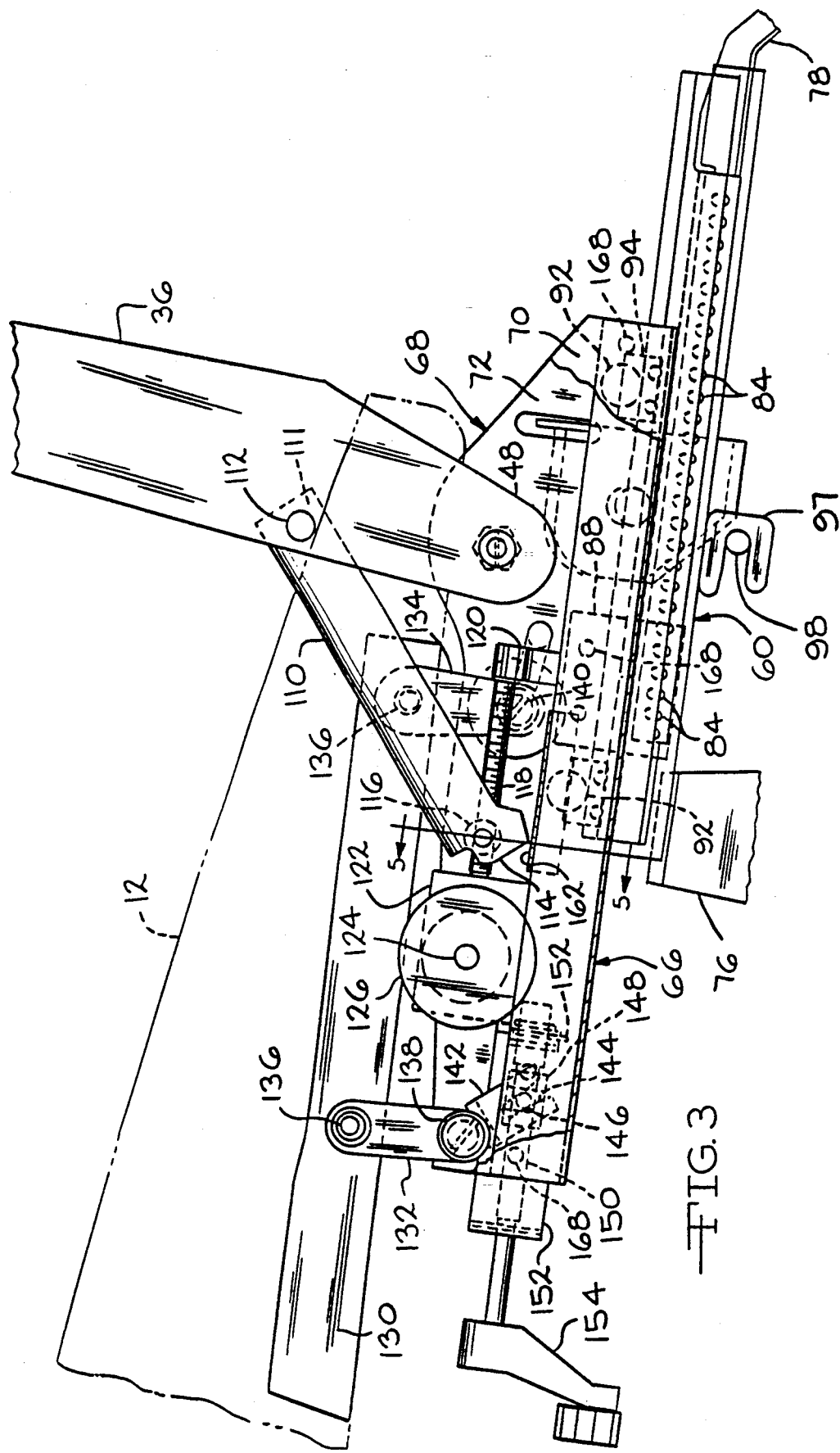

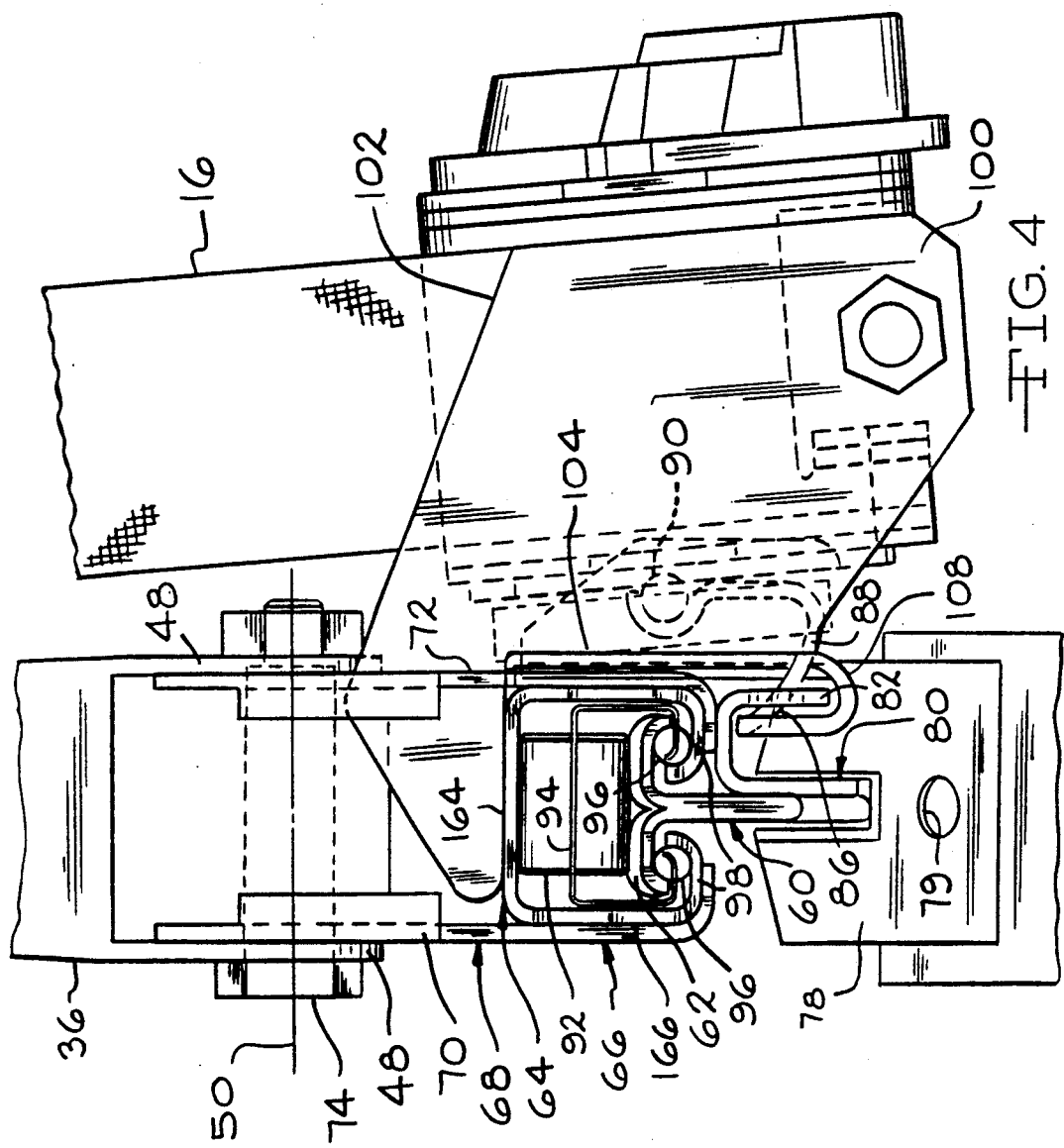

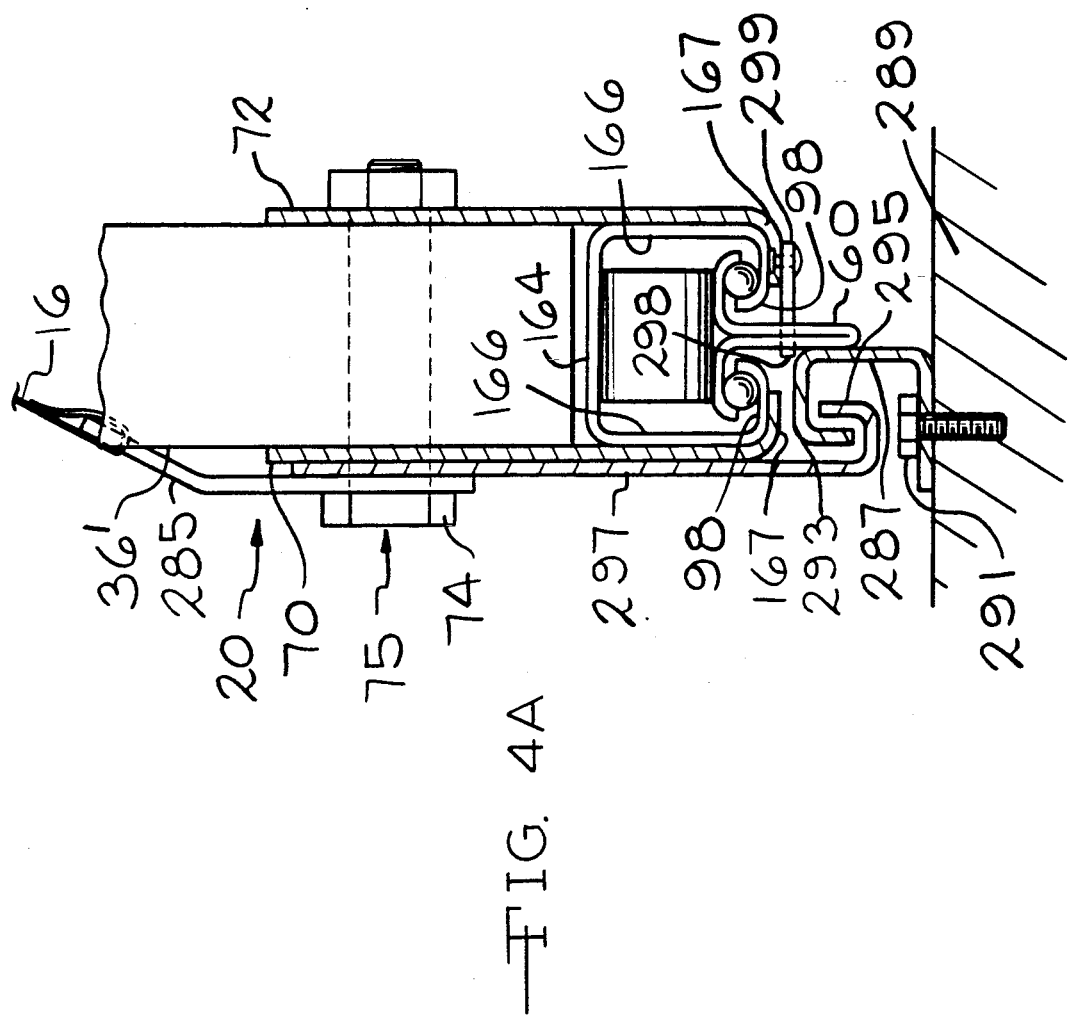

VEHICLE SEAT ASSEMBLY WITH STRUCTURAL SEAT BACK TO ACCOMMODATE SEAT BELT LOADS APPLIED TO SEAT BACK

CROSS REFERENCE TO RELATED APPLICATION

This is a continuation-in-part of copending U.S. patent application Ser. No. 659,500 filed Feb. 22, 1991.

BACKGROUND AND SUMMARY OF THE INVENTION

The present invention relates to a vehicle seat assembly and in particular to a seat assembly that also carries a seat belt system and is configured to withstand the high seat belt loads incurred during a vehicle collision.

Vehicle seat belt systems are typically mounted directly to the vehicle structure. For example, most belt systems have the belt retractor mounted to the vehicle floor pan with the belt webbing extending upwardly along the B-pillar of the vehicle to a D-ring mounted to the pillar. The webbing then extends downward to a belt end connected to the vehicle floor adjacent to the retractor. A clasp is slidably movable between the end of the seat belt anchored to the vehicle floor and the D-ring on the B-pillar. A buckle is attached to the vehicle floor on the opposite side of the seat. When the clasp is pulled across the user and inserted into the buckle, the webbing forms a lap belt and a shoulder belt to retain the occupant in the seat assembly.

The position of the vehicle seat assembly in the vehicle is adjustable in at least the fore and aft direction. With adjustment, the seat assembly is moved relative to the seat belt attachment points such that it can become inconvenient and uncomfortable for a seat occupant to use the seat belt. For example, if the vehicle seat is moved to its forwardmost position, it may be difficult to reach back to grasp the seat belt clasp along the B-pillar. In addition, with the seat moved forward, the shoulder belt may rub across the occupant's neck creating a discomfort. If the seat is adjusted to its rearwardmost position, the shoulder belt may be located too far forward relative to the occupant such that the person's torso can move forward some distance unrestrained by the shoulder belt.

Accordingly, it is an object of the present invention to provide a three point seat belt system comprising a lap belt and a shoulder belt that is mounted to and carried by the seat assembly itself so that regardless of the position of the seat assembly in the vehicle, the belt system remains in a constant position relative to the seat assembly and seat occupant.

It is another object of the invention, of course, to provide a seat assembly capable of withstanding the seat belt loads incurred during a vehicle collision.

It is also an object of the invention to provide a seat assembly that is as structurally similar to current production seat assemblies to minimize nonstructural changes to the seat assembly.

It is a further object of the invention to include in the seat assembly of this invention features commonly found in seat assemblies such as a seat back recliner, a fore and aft seat adjuster, an adjustable lumbar support mechanism and a vertical lift mechanism to raise the seat cushion.

The seat assembly of the present invention includes a pair of fore and aft extending fixed rails disposed along the lateral sides of the seat assembly with each rail having a track portion adapted to engage with the track portion of a pair of slide rails mounted on each fixed rail. The slide rails include the previously mentioned track portion as well as a riser portion extending upwardly from the track portion. The seat cushion pan is coupled to the slide rails through a four bar linkage mechanism used to raise and lower the seat cushion.

The seat back frame is pivotally mounted to the slide rails and extends generally upwardly from the rear of the seat cushion in a conventional manner. The seat belt system includes a belt retractor attached to an upper slide rail along one side of the seat assembly near the rear of the seat assembly. The belt extends from the retractor upwardly through the seat back to the top of the seat back where the belt projects forwardly from the seat cushion and extends downwardly along the same side where the belt end is attached to the slide rail. A buckle assembly is attached to the slide rail on the opposite side of the seat assembly and a clasp is slidably carried by the belt webbing between the belt end and the upper end of the seat back. When the clasp is pulled over the user's body and inserted into the buckle, the belt webbing is drawn out of the retractor forming a shoulder strap and a lap belt.

To accommodate the seat belt loads applied to the seat back. The back frame is formed with a beam extending generally upwardly along the side of the seat back to which the belt retractor and belt end are attached. The beam has a tapered closed-section that compensates for the increasing moment along its length to provide uniform material stress. The beam is of a hollow structure which tapers in an upwardly direction so as to reduce the quantity of material used in the beam at the upper end where the moment carried by the beam is reduced.

The overall seat back frame structure is a quadrilateral with the upright beam forming one side of the quadrilateral. An upright member on the opposite seat side as well as upper and lower cross members are formed of a hollow tube, flattened in portions, and of significantly lesser structural capability than the upright beam. For lateral stability a diagonal brace (truss) extends from the upper end of the upright beam to the lower end of the opposite vertical frame member. The diagonal beam also has a flattened tubular structure.

The seat recliner mechanism is a single sided recliner on the same side of the seat as the seat belt assembly and is used to resist forward rotation of the seat back caused by seat belt loads applied to the seat back. The recliner mechanism includes a brace pivotally connected to the upright beam of the seat frame and extending downwardly and forwardly to a pivotal coupling with the upper slide rail. The forward end of the brace carries a nut through which a lead screw, rotatably carried by the sliding rail, is threaded whereby rotation of the lead screw moves the brace fore and aft along the slide rail to adjust the position of the seat back.

A seat back dump feature can be included in the seat assembly for use as the front seat in a two-door vehicle. The dump feature is made possible by providing the pivotal coupling of the brace to the seat back frame with a selectively releasable mechanism to enable the seat back to pivot forward to a dump position without readjustment of the seat back recliner mechanism being required.

A mechanical adjustable lumbar support mechanism is provided in the seat back and includes a support paddle carried by a single piece bent wire to move the paddle in and out relative to the seat cushion.

Further objects, features and advantages of the invention will become apparent from a consideration of the following description and the appended claims when taken in connection with the accompanying drawings.

BRIEF DESCRIPTION OF THE DRAWINGS

FIG. 3 is a side view of the seat assembly frame and track structure;

FIG. 4 is an end view of the seat frame structure of claim 3;

FIG. 4A is an end view of an alternative embodiment of the seat frame;

DETAILED DESCRIPTION OF THE INVENTION

Figure 1:
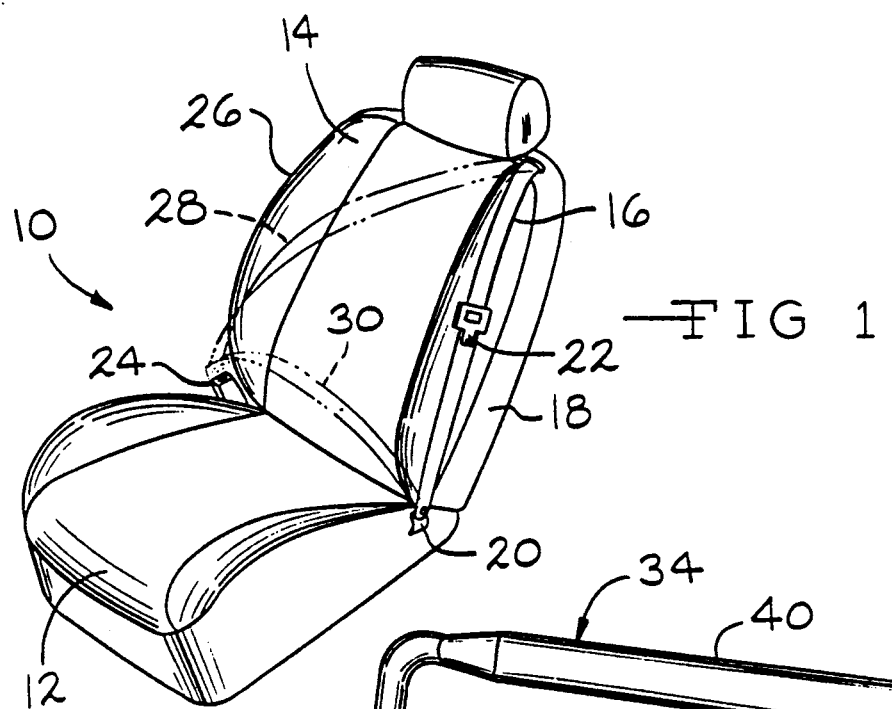
FIG. 1 is a perspective view of the seat assembly of the present invention.

The seat assembly of the present invention is shown in FIG. 1 and designated generally at 10. Seat assembly 10 includes a seat cushion 12 and a seat back 14 extending generally upwardly at the rear of the seat cushion. A seat belt webbing 16 extends outwardly from the top front of the seat back along the outboard side 18 of the seat assembly. The webbing 16 extends downwardly along the outboard side where one end of the seat belt webbing is attached to the seat assembly at 20. Clasp 22 is slidable along the seat belt webbing between the attachment 20 and the seat back upper end. A buckle mechanism 24 is attached to the inboard side 26 of the seat assembly for reception of the clasp 22 therein. When the clasp 22 is inserted into the buckle, the webbing 16 forms a shoulder belt 28 and a lap belt 30 shown in phantom.

The terminology "inboard" and "outboard" is used as a convenience to designate the sides of the seat assembly. As is typically the case, the shoulder belt extends from the upper outboard side of the seat assembly 20 to the lower inboard side of the seat assembly. The seat assembly of the present invention has been shown and described in this manner. However, nothing herein should be construed so as to limit the seat assembly of the present invention to such a belt configuration.

The seat back frame 34 includes a hollow main beam 36 along the outboard side of the seat and a bent tube 38 forming an upper cross member 40 an inboard vertical member 42 and a lower cross member 44. The bent tube 38 and upright beam 36 form a quadrilateral shape frame. A diagonal brace 46 extends from the upper end of the upright beam 36 to the lower end of the inboard vertical member 42. The bottom of beam 36 forms two parallel mounting flanges 48 defining a pivot axis 50 for the seat back. A mounting flange 52 extends downwardly from the end of the inboard vertical member 42 forming a mount on the inboard side of the seat back.

The upper end of the beam 36 includes a bracket 54 to support the belt webbing 16 which extends upwardly behind the beam 36, over the bracket 54 and then downward along the front of the seat back. During a vehicle collision, the load applied to the seat back by the shoulder belt 28 will produce a compressive load in the diagonal brace 46, a tensile load in the lower cross member 44, and a compressive load and forward bending moment in the upright beam 36. In addition to accommodating seat belt loads, the diagonal brace 46 will also resist side impact loading.

Figure 5:
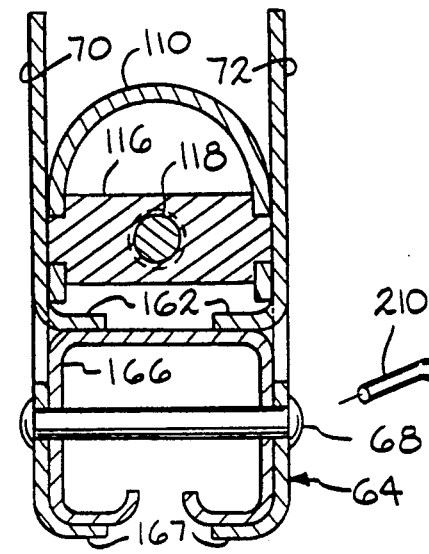
FIG. 5 is a sectional view as seen from substantially the line 5—5 of FIG. 4.

With reference to FIGS. 3, 4 and 5, seat assembly 10 includes a pair of fixed rails 60 with one rail disposed along the outboard side and the other rail disposed along the inboard side of the seat assembly. The outboard side of the seat assembly is shown to describe the invention. Fixed rail 60 is generally T-shaped in cross section with the upper cross bar of the "T" forming an enlarged upper mounting track portion 62. The track portion 62 engages with the C-shaped slide track portion 64 of the slide rail assembly 66. The seat assembly includes a pair of slide rail assemblies 66 with one mounted to each of the fixed rails 60. Slide rail assembly 66, in addition to the slide track portion 64 includes a riser portion 68 which extends upwardly from the slide track portion 64 in the form of two spaced plates 70 and 72. The mounting flanges 48 and 52 of the seat back frame are pivotally connected to the riser portion 68 of the two slide rails at seat back pivot 74.

An inverted U-shaped latch bracket 80 is mounted to the fixed rail 60 along the inboard side of the rail and below the fixed track portion 62. The inward leg portion 82 of latch bracket 80 is spaced from the fixed rail and includes a plurality of perforations 84 through which the teeth 86 of latch 88 are inserted. The latch 88 is pivotally carried by the slide rail assembly 66 for rotation about pivot 90. A conventional latch release mechanism (not shown) is coupled with the latch 88 to withdraw the teeth 86 from the perforations 84 to enable the slide rail assembly 66 to move fore and aft relative to the fixed rail 60 whereby the fore and aft position of the seat is adjusted.

The slide rail assembly 66 is supported upon the fixed rail 60 by a pair of rollers 92 disposed within the C-shaped cross section of the slide track portion 64 and held in place by race 94. A plurality of roller balls 96 are placed between the inwardly turned flanges 98 of the slide track portion 64 and the fixed track portion 62 of the fixed rail for ease of sliding movement of the slide rail assembly relative to the fixed rail.

A seat belt retractor 100 is attached to the slide rail assembly 66 by bracket 102. Bracket 102 has a mounting flange portion 104 through which the bracket is fastened to the slide rail assembly by bolts or rivets (not shown). Flange 104 also includes a J-hook portion 108 which extends upwardly into the interior of the U-shaped latch bracket 80 fixed attached to the fixed rail 60. Belt webbing 16 extends upwardly from the retractor 100 to the top of upright beam 36.

The seat assembly is supported by the vehicle floor at three locations along each side. The front end of the fixed rail 60 rests on a support pedestal 76. The rearward end of the fixed rail 60 terminates in a mounting flange 78 having an aperture 79 therethrough for suitable bolt or other fastener. A mounting hook 97 is coupled to the fixed rail between the front and rear ends of the fixed rail for engagement with a floor pin 98. Hook 96 serves to reduce the length of the moment arm of the fixed rail when seat belt applies upward loads on the fixed rail.

The recliner mechanism includes a support brace 110 having one end 111 pivotally connected to the seat back upright beam 36 at pivot 112. Pivot 112 is spaced above the seat back rotational pivot 74 so that rearward movement of the brace 110 causes the seat back to rotate rearward about pivot 74. The opposite end 114 of the brace is pivotally coupled to a drive nut 116 which is in turn threadably connected to a lead screw 118. The lead screw 118 extends fore and aft between the two riser plates 70 and 72.

Lead screw 118 is coupled to the slide rail assembly 66 by bearing support 120 and right angle drive assembly 122. The drive assembly 122 contains a pair of 45 bevel gears coupling the lead screw 118 to a drive shaft 124 extending outwardly through riser plate 70. A hand knob 126, accessible along the outboard side of the seat assembly, is rotated by a seat occupant to rotate lead screw 118. Rotation of the lead screw in turn causes the drive nut 116 to travel fore and aft along the length of the lead screw. In so doing, the end 114 of the support brace 110 is moved fore and aft causing the brace end 111 to move. However, due to the pivotal coupling 112 of support brace 110 to the seat back the end 111 travels in an arcuate path about the pivot 74 rotating the seat back to various inclined positions.

FIGS. 9 through 13 disclose an alternative embodiment of the seat assembly which includes a forward dump mechanism to enable the seat back to be rotated forwardly to increase access to the area behind the seat assembly. Like components are given identical reference numerals whereas modified components are given the same reference numeral with the addition of the suffix "a". The dump feature is provided for by including, in the seat back upright beam 36a, a mechanism for releasing the connection between the seat back and the support brace 110 to enable the seat back to be rotated free of restraint from the support brace. This mechanism enables the adjusted reclined position of the seat back to be maintained when the seat back is returned to its normal position from the forward dump position. Pin 112 at the upper end of support brace 110 is slidably captured within an generally S-shaped slot 250 formed in the two side walls 252 and 254 of the upright beam 36a. In the upright position, i.e. use position of the seat back, the pin 112 is held in the forward end 256 of the slot 250. A cam 258 is disposed between the two side walls of the beam and carried by the beam for rotation about the axis of shaft 260.

Figure 9:
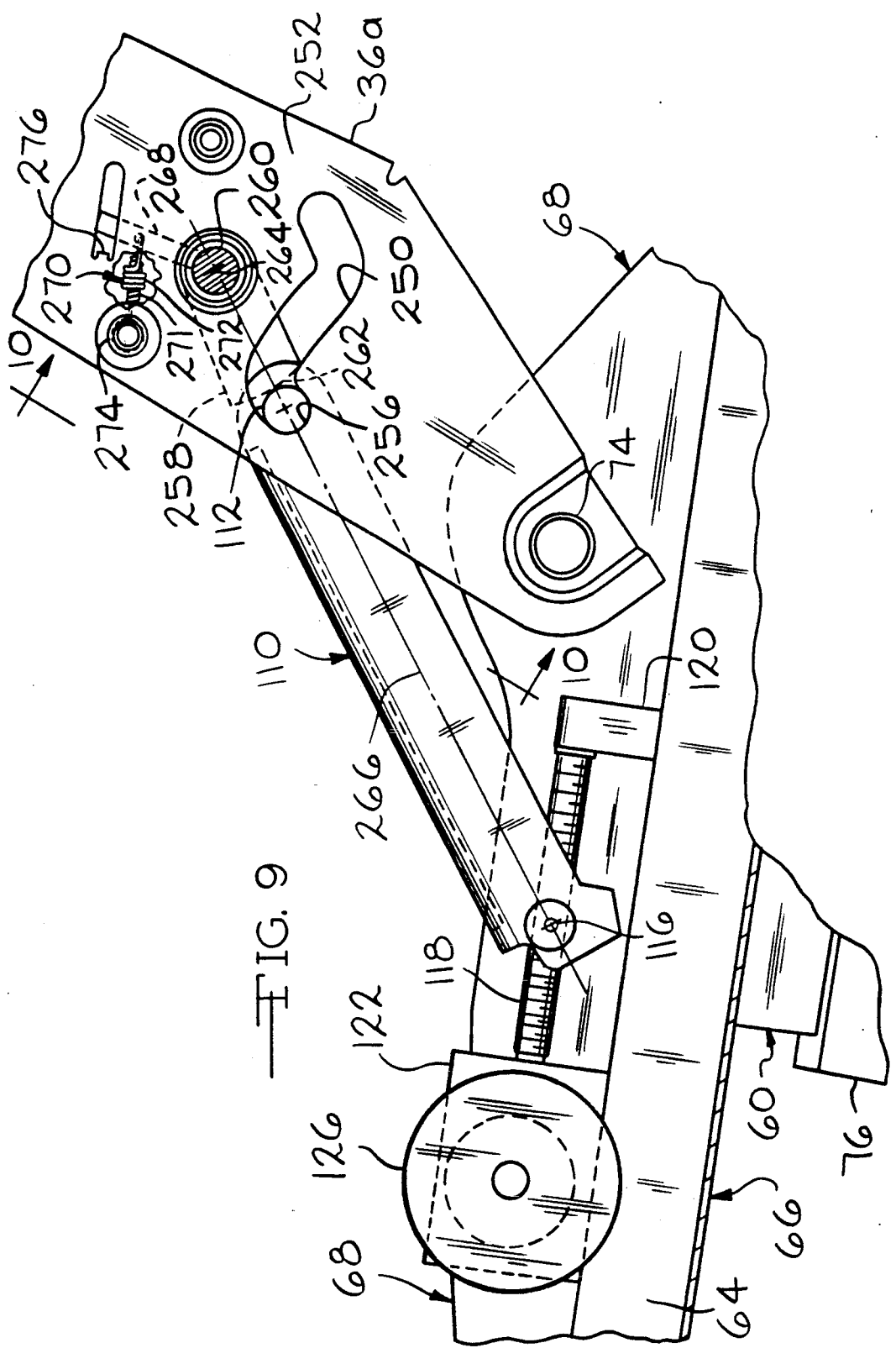
FIGS. 9, 11 and 12 are fragmentary side elevational views of an alternative embodiment of the seat assembly showing a release mechanism for dumping the seat back forward.
Figure 10:
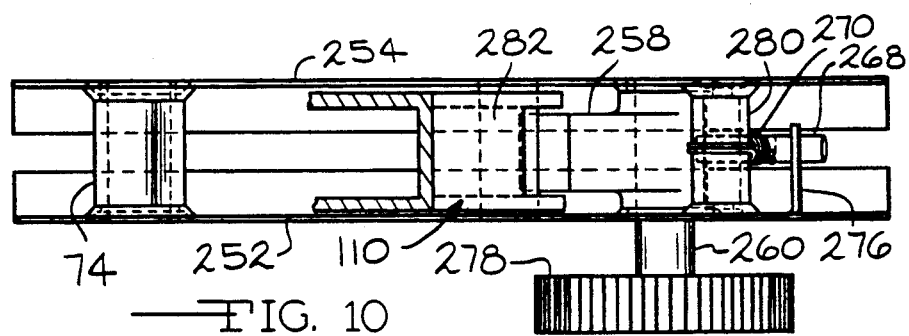
FIG. 10 is a sectional view as seen from the line 10—10 of FIG. 9.
Figure 11:
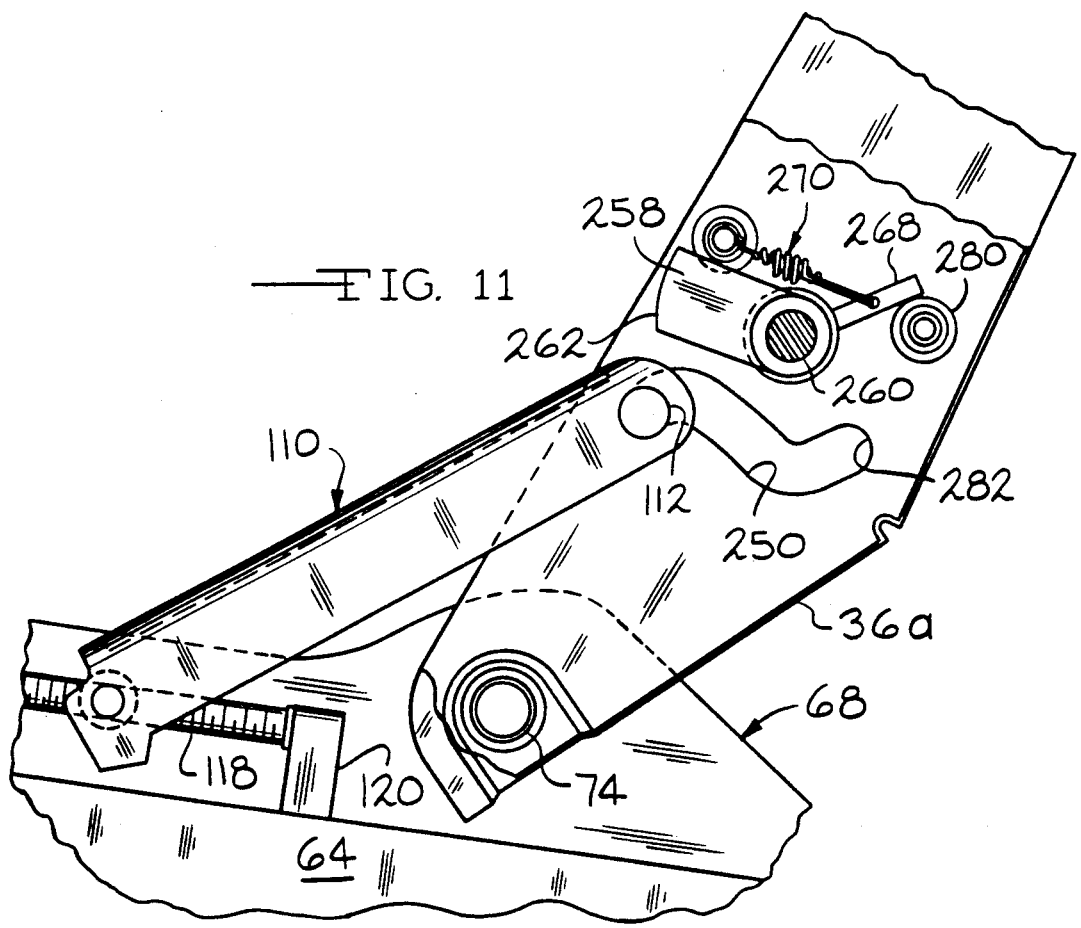

In the locked position shown in FIG. 9, the arcuate cam surface 262 at the end of the cam 258 engages the pin 112, holding it in the end 256 of the slot. The center of rotation 264 of the cam is positioned so as to be aligned with or closely aligned with the center line 266 of the support brace defined by the pivots at the ends of the brace. By providing alignment of the cam rotation with the support brace, forces exerted on the cam during a vehicle collision produce no or minimal torque on the cam that could rotate the cam from the locked position. The high normal force applied to the cam surface produces sufficient friction to resist any torque applied to the cam. Thus, the forward dump mechanism is capable of withstanding the seat belt loads applied to the seat assembly during a vehicle collision.

A lever 268 extends radially from the cam and is coupled to a spring assembly 270 consisting of a pair of springs 271 and 272 that are used to couple the lever 268 with a spacer 274 between the side walls of the upright beam. The spring assembly 270 biases the cam in shaft 260 in a counterclockwise direction as shown in FIG. 9 to move the cam into the locked position. A stop 276 is formed by bending in a portion of the beam side wall 252 inwardly. The stop 276 serves to limit the counterclockwise rotation of the cam and shaft 260. Typically, and preferably, the rotation of the cam will be stopped by engagement with the pin 112 prior to contact of the lever with the stop 276. Spring assembly 270 includes two springs as a redundancy in the event one spring fails.

Figure 12:
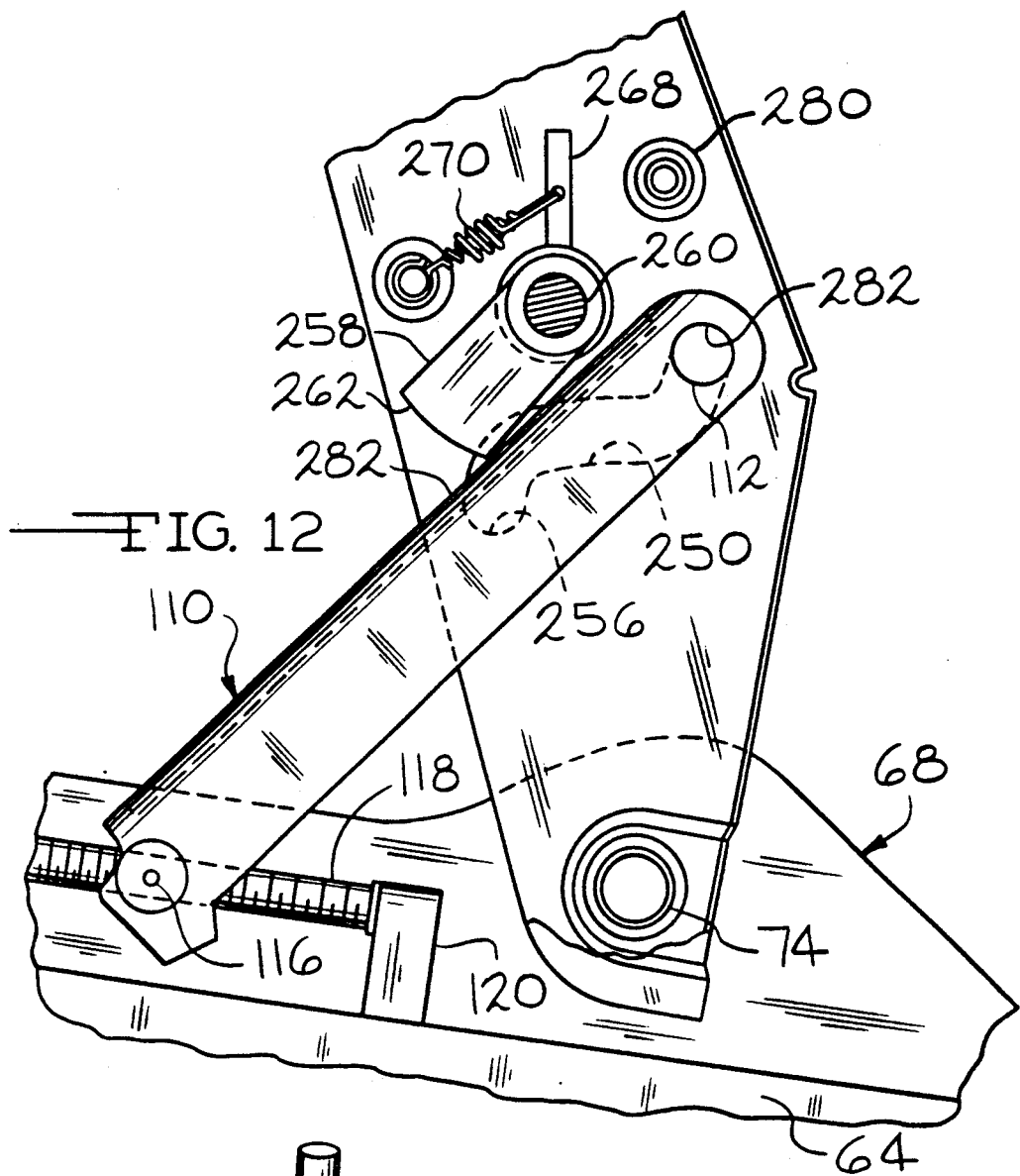
Figure 13:
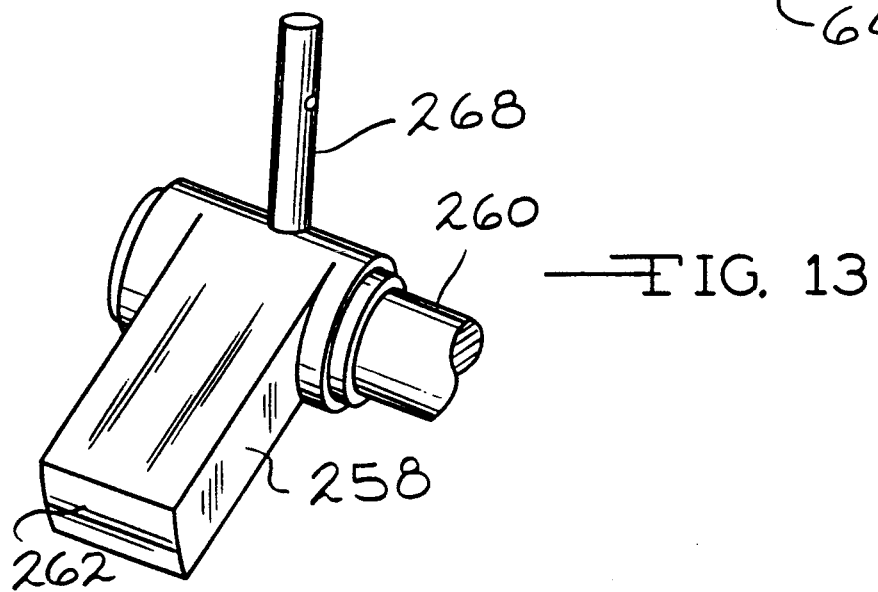
FIG. 13 is a perspective view of the cam used to lock the seat back in its normal upright position.

A hand knob 278, or similar structure, is coupled to the shaft 260 and extends outwardly of the seat assembly for grasping by a vehicle occupant to rotate the cam in opposition to the spring assembly 270 to release the seat back. Manual clockwise rotation of the shaft 260 moves the cam to the release position shown in FIG. 11 in which it is disengaged from the pin 112. The lever 268 will engage a spacer 280 to limit the clockwise rotation of the cam. Once the cam has been released, the seat back is free to rotate forward about its pivot 74 as shown in FIG. 12 until the pin 112 reaches the opposite slot end 284, Upon release of the hand knob 278, the spring assembly 270 will rotate the cam counterclockwise until the cam engages the top surface 282 of the support brace 110, as shown in FIG. 12.

Upon return of the seat back to its upright position, once the cam 258 clears the top wall 282 and pin 112, the spring assembly 270 will rotate the cam back to a locking engagement with the pin 112. The cam surface 262 is slightly eccentric with respect to the cam pivot point such that during rotation to the locking position, the cam surface progresses further from the pivot point until engagement with the pin 112. By releasing the seat back from the brace 110 for dump operation, the adjusted position of the support brace with the lead screw 118 is maintained. Upon return of the seat back to its normal position, no readjustment of the recliner mechanism is required.

The seat cushion 12 is carried by a seat pan 130 which is in turn coupled to the slide rail assembly 66 by a four bar lift mechanism. The lift mechanism includes a pair of lift levers on each side of the seat assembly carrying the seat pan 130 at four points. Fore and aft lift levers 132 and 134 are pivotally coupled to the seat pan 130 about at their respective pivots 136. The lower ends of the lift levers are rigidly coupled to a fore and aft pivot shafts 138 and 140 respectively. Pivot shafts 138 and 140 extend laterally across the seat assembly from the outboard slide rail assembly to the inboard slide rail assembly. As the pivot shafts 138 and 140 are rotated, the lift levers 132 and 134 operate to raise or lower the seat pan and cushion between a lowered rearward position to a raised forward position. The amount of lift relative to fore and aft travel of the seat cushion depends on the lengths of the lift levers as well as their angular position. Furthermore, the amount of lift at the front of the seat can be equal or unequal to the amount of lift at the rear depending on the length and angular position of the lift levers.

The aft lift levers 134 are wider at the pivot 136 where they are attached to the seat cushion pan 130 than they are at pivot shaft 140. This increased width reinforces the pan 30 at the lift lever attachment.

The forward pivot shaft 138 is rotated by a drive lever 142 also rigidly attached to the forward pivot shaft 138. Drive lever 142 contains a radially extending slot 144 in which a pin 146 from drive nut 148 is inserted. Drive nut 148 is threadably coupled to a lead screw 150 for fore and aft movement upon rotation of the lead screw. Lead screw 150 is attached to one of the slide rail assemblies by bearing supports 152. A crank 154 accessible from the front of the cushion 12 is used to rotate lead screw 150. As the drive nut 148 is moved along the length of the lead screw, the pin 146 will travel through the slot 144, transferring the linear motion of the nut 148 into rotational motion of the drive lever 142, thus raising or lowering the cushion 12 depending upon the direction of rotation of lead screw 150. The aft pivot shaft and lift levers rotate in response to rotation of the fore pivot shaft.

The lead screw seat lifter provides a simple mechanism to adjust the seat cushion position and to hold the seat cushion in place. The slot 144 in levers 142 enables the linear motion of drive nut 148 to rotate the drive lever. By driving the fore pivot shaft the lead screw can be relative short rather than having to extend from the front of the cushion to the aft pivot shaft. If desired, the lead screw can be driven by an electric motor/transmission assembly instead of by crank 154.

Figure 2:
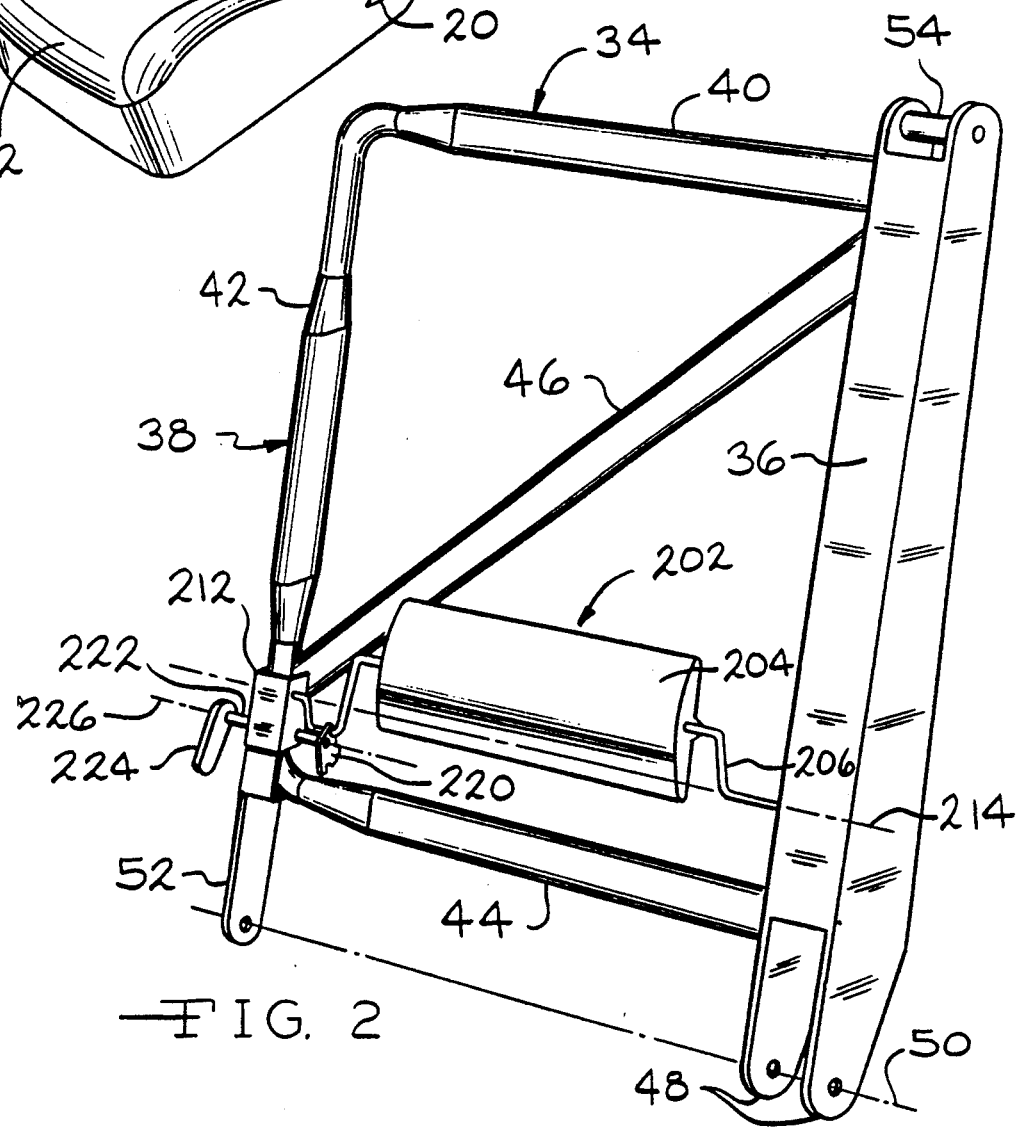
FIG. 2 is a perspective view of the seat back frame and lumbar support mechanism.

The seat assembly 10 also includes a mechanical lumbar support 202 shown in FIG. 2. Lumbar support 202 can be used to provide adjustable support to the lumbar region of the back of a seat occupant. Lumbar support 202 includes a support paddle 204 carried by a single piece bent wire 206 pivotally mounted to the seat back frame.

Figure 6:
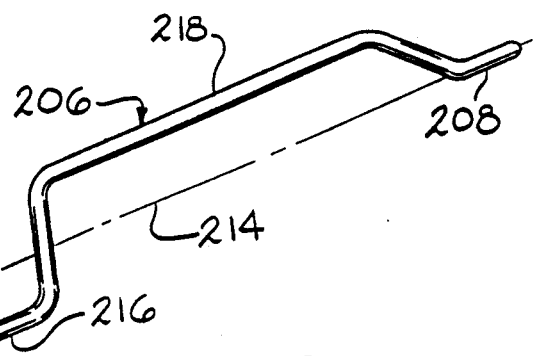
FIG. 6 is a perspective view of the bent wire carrying the lumbar support paddle.
Figure 7:
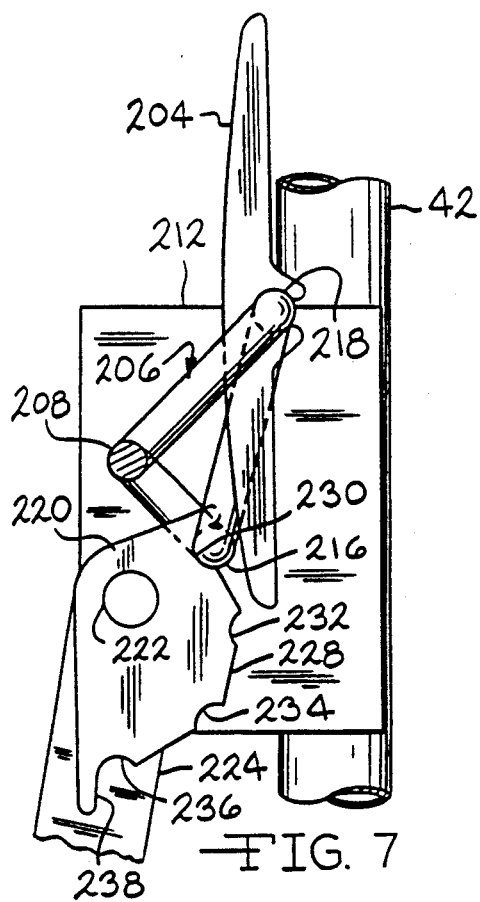
FIGS. 7 and 8 are side views of the lumbar support showing two adjusted lumbar support paddle.
Figure 8:
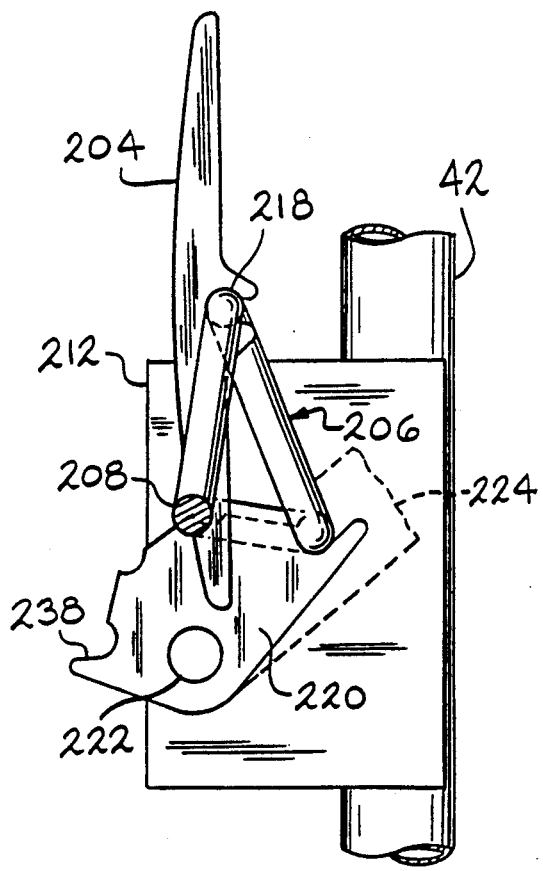

Bent wire 206, shown in greater detail in FIGS. 6–8, includes a pair of end portions 208 and 210 that are coupled to the hollow beam 36 and upright support 42 of the seat back frame respectively. One end portion is pivotally mounted on a bracket 212 secured to the seat back frame. The other end portion 208 pivots directly in the hollow beam 36. The end portions are aligned so that the wire can rotate about a generally horizontal axis 214 extending through the end portions and extending transversely of the seat back.

The wire is bent to form a follower portion 216 adjacent to end portion 210 which forms an offset crank for rotating the bent wire 206 as described below. The center of bent wire 206 forms a lumbar paddle attachment portion 218 to which the lumbar support paddle 204 is pivotally mounted.

A cam 220 is fixably secured to a shaft 222 which extends horizontally through one of the brackets 212 and is rotatably supported thereon. An actuating handle or lever 224 is secured to the opposite end of shaft 222 to enable manipulation of the handle to rotate the cam 220 about the pivot axis 226 corresponding to the axis of shaft 222. The cam 220 has a control side or surface 228 which is in continuous engagement with the follower portion 216 of the bent wire and is provided with a plurality of defined stop surface portions 230, 232, 234 and 236 which are located at progressively increasing distances from the pivot axis 226 Beyond the stop surfaces 230 and 236 the cam is provided with stop walls 238 to prevent excessive rotation of the cam and disengagement from the follower portion 216 of the bent wire.

Rotation of the handle 224 causes the bent wire to rotate about the axis 214 moving the support panel 204 in or out relative to the seat back to increase or decrease the support provided to the seat occupant lumbar region. The wire 206 is bent to form the follower portion as well as the two end portions to provide a simple mechanical lumbar support. Previous mechanical lumbar supports included a weldment structure to carry a radially spaced follower portion or include an extension welded to the wire to form the follower portion. Such structures are more complicate to manufacture, requiring multiple assembly operations and further have decreased reliability in that there is an opportunity for failure by separation of the welded components. These disadvantages are not present with the single bent wire structure which is formed of a single member not requiring any assembly operations.

Seat assembly 10, while providing many features found in a conventional seat assembly not equipped with a seat belt system, such as a recliner mechanism, a vertical lift mechanism adjustable lumbar support and a fore and aft seat adjustment mechanism, is in many respects structurally similar to a conventional seat assembly. However, many modifications have been made to the seat assembly to provide the necessary strength to accommodate the seat belt loads.

The recliner mechanism is the only structure which acts upon the seat back to resist forward rotation in response to seat belt loads applied thereto. The end 114 of support brace 110 is positioned between the two riser plates 70 and 72 to prevent lateral deflection or shifting of the support brace 110 when it is loaded in compression. The support brace is closely spaced from the slide track portion so that very little downward deflection of the support brace is needed before engagement with the slide track portion, lending additional support during a collision. At the point of contact between the support brace and slide track portion, the two riser plates form upturned tabs 162 overlying the slide track portion. These tabs serve to reinforce the slide track portion at the point of loading. The right angle drive assembly 122 sandwiched between the two riser plates 70 and 72 form a rigid structure to resist forward deflection of the support brace.

The riser plates themselves are specifically configured to assist in carrying seat belt loads. A typical riser plate is bolted or riveted directly to the top portion 164 of the C-shaped slide track portion 64. With such an arrangement, however, loads applied to the riser plates are carried directly through the attaching bolts or rivets. The riser plate 70 and 72 are instead configured generally with an L-shaped cross section extending downwardly along the sides 166 of the C-shaped slide track portions. The bottoms 167 of the L-shaped section are folded under the C-shaped slide track portion. A plurality of rivets 168 extend through the riser plates 70 and 72 and the C-shaped track portion 64. The rivets act to hold the slide rail assembly together and prevent lateral deformation or unfolding of the L-shaped riser plates, C-shaped slide track portion and the T-shaped fixed rail.

The J-hook portion 108 of the retractor mounting bracket 102 also provides additional support. The upward forces applied to the seat back bracket will cause the J-hook to engage the latch bracket 80 to resist further motion. The teeth 86 of latch 88 also extend upwardly toward the U-shaped latch bracket to resist deformation. In addition, the latch 88 is equipped with five teeth 86 for increased strength.

An alternative embodiment of the frame structure is shown in FIG. 4A. In this embodiment, like elements are given the same reference numeral and similar elements are given the same reference numeral followed by a prime. As shown in FIG. 4A, the beam 36' is modified to be disposed within the two risers plates 70 and 72 rather than being mounted to the outside of the riser plates as shown in FIG. 4. The attachment 20 of the seat belt webbing 16 to the frame is accomplished by a lap belt anchor 285 that is bolted to the frame by the nut and bolt assembly 75 forming the pivot 74.

The fixed rail 60 is mounted to the vehicle structure through a base plate 287 fastened to the vehicle structure 289 by bolt 291. The upper end of the base plate forms an inverted J-hook 293 that captures the lower end 295 of the J-hook 297. J-hook 297 is fastened to the nut and bolt assembly 75 that mounts the seat belt anchor 285 and the beam 36' to the riser plates 70 and 72. As a result, during a vehicle collision, the belt loading applied by the lap belt and the shoulder belt is transferred directly to the vehicle structure through the J-hook 297 and base plate 287, bypassing the fixed rail 60. The J-hook 297, by being captured by the base plate 287, has limited vertical movement.

The fore and aft position of the seat assembly is fixed by a latch plate 299 slidably mounted to the lower end 167 of the riser plate 72. The latch plate includes a plurality of teeth 298 that extend through locking windows in the fixed rail 60 in a well known manner for seat adjusters. The latch plate 299 is located forward of the base plate 287 for all adjusted positions of the seat assembly to prevent interference between the two components.

The seat assembly 10, while providing additional structure and strength necessary to accommodate seat belt loads, has accomplished this by efficient management of material, avoiding the use of excess material where not needed. One example of this is the tapered section of the upright beam 3 which decreases in section as the bending moment applied to the beam also decreases toward the upper end of the beam.

The seat assembly 10 thus accomplishes the objectives of the present invention of providing a seat assembly to which the seat belt system is carried to overcome the inconveniences of having a seat belt system coupled to the vehicle structure with the seat assembly being movable relative to the belt system. In accomplishing these objectives the seat assembly 10 has maintained many elements of a traditional seat structure and many features of a seat assembly while providing the necessary strength to accommodate the added loads applied to the seat assembly by the seat belt system.

It is to be understood that the invention is not limited to the exact construction or method illustrated and described above, but that various changes and modifications may be made without departing from the spirit and scope of the invention as defined in the following claims.

We claim:

1. A vehicle seat assembly for a seat occupant having a lap, a torso and a waist, said seat assembly having two lateral sides, comprising:

a lower seat frame having a rear portion;

a seat back frame having upper and lower ends extending generally upwardly at said rear portion of said lower seat frame and being pivotally mounted to said lower seat frame by a pivotal mount for selective adjustment to plural angular positions relative to said lower seat frame, said seat back frame having first and second generally upright members with one upright member at each side of said seat back frame with said first upright member being reinforced relative to said second upright member to withstand higher loading without deformation and a diagonal support member extending from the upper end of said first upright member to the lower end of said second upright member, said diagonal brace transferring loads applied to said first upright member at the upper end thereof to the lower end of said second upright member through compression and tension of said diagonal brace;

seat belt means carried by said lower seat frame and said seat back frame, said seat belt means including a belt webbing forming a lap belt extending from one side to the other side of said seat assembly at said rear portion of said lower seat frame and a shoulder belt extending from approximately the top of said first upright member of said seat back to said lower seat frame rear portion on the opposite side of the seat assembly; and recliner means disposed solely at one side of said seat assembly including a recliner brace pivotally coupled at a first end to said first upright member above the pivotal mount of said back frame with said lower frame, said brace extending downwardly and forwardly to a second end pivotally coupled to said lower seat frame and drive means at said one side for moving said second end fore and aft along said lower seat frame whereby said seat back frame pivots relative to said lower seat frame to adjust the angular position of said seat back frame relative to said lower seat frame.

2. The seat assembly of claim 1 wherein said first upright is a hollow beam that tapers in an upwardly direction.

3. The seat assembly of claim 1 wherein said drive means includes a lead screw rotationally mounted to said lower seat frame and extending fore and aft relative to said seat assembly with the second end of said brace being coupled to said lead screw by a threaded drive nut whereby rotation of said lead screw causes the second end of said brace to move fore and aft along said lower seat frame.

4. A vehicle seat assembly having spaced lateral sides comprising:

a lower seat frame;

a seat back frame extending generally upwardly at a rear portion of said lower seat frame and being pivotally mounted to said lower seat frame by a pivotal mount for selective adjustment to plural angular positions relative to said lower seat frame, said seat back frame having a first upright member at one lateral side of said seat assembly;

recliner means at said one lateral side of said seat assembly including a recliner brace pivotally coupled at a first end to said first upright member above the pivotal mount of said back frame with said lower frame, said brace extending downwardly and forwardly to a second end pivotally coupled to said lower seat frame and drive means for moving said second end fore and aft along said lower seat frame whereby said seat back frame pivots relative to said lower seat frame to adjust the angular position of said seat back frame relative to said lower seat frame; and means for selectively releasing the first end of said brace from said first upright member to enable said seat back frame to pivot forward free of restraint by said brace from an upright operative position to a forwardly rotated dump position.

5. The seat assembly of claim 4 wherein said first upright member is a hollow beam having a pair of transversely spaced side walls, a front wall and a rear wall, and said release means comprises:

said spaced side walls being formed with identical slots therein extending generally fore and aft, each of said slots having a forward end and a rear end;

said brace first end being disposed within said hollow beam through an opening in said front wall;

a pin member extending transversely through said brace first end with end portions of said pin member being confined in said slots in said side walls, said pin member having a rear surface and said pin member being positioned at said forward ends of said slots when said seat back frame is in said upright operative position and said pin member being positioned at the rear ends of said slots when said seat back frame is in said dump position;

latch means carried by said first upright member for engagement with the rear surface of said pin member to retain said pin member at said forward ends of said slots to prevent said seat back frame from pivoting forward from said upright operative position; and means for selectively releasing said latch means to disengage said latch means from said pin member rear surface whereby said seat back frame is free to rotate to said dump position.

6. The seat assembly of claim 5 wherein said latch means comprises cam means pivotally mounted to said first upright member for rotation about a generally horizontal pivot axis extending laterally of said seat assembly, said pivot axis being substantially normal to and coplanar with a load axis of said brace whereby a load applied to said cam means by said brace produces a minimal torque on said cam means.

7. The seat assembly of claim 6 wherein said cam means includes a cam surface eccentric to said pivot axis of said cam means for engagement with said rear surface of said pin member.

8. The seat assembly of claim 6 further comprising bias means coupled to said latch means for rotating said latch means in one direction toward engagement with said pin member rear surface when said seat back frame is in said operative position.

9. A vehicle seat assembly for a seat occupant having a lap, a torso and a waist, said seat assembly having two lateral sides, comprising:

a lower seat frame having a rear portion;

a seat back frame extending generally upwardly at said rear portion of said lower seat frame and being pivotally mounted to said lower seat frame by a pivotal mount for selective adjustment to plural angular positions relative to said lower seat frame, said seat back frame having first and second generally upright members with one upright member at each side of said seat back frame with said first upright member being reinforced relative to said second upright member to withstand higher loading without deformation;

seat belt means carried by said lower seat frame and said seat back frame, said seat belt meaNs including a belt webbing forming a lap belt extending from one side to the other side of said assembly at said rear portion of said lower seat frame and a shoulder belt extending from approximately the top of said first upright member of said seat back to said lower seat frame rear portion on the opposite side of the seat assembly;

recliner means disposed solely at one side of said seat assembly including a recliner brace pivotally coupled at a first end to said first upright member above the pivotal mount of said back frame with said lower frame, said brace extending downwardly and forwardly to a second end pivotably coupled to said lower seat frame and drive means at said one side for moving said second end fore and aft along said lower seat frame whereby said seat back frame pivots relative to said lower seat frame to adjust the angular position of asid seat back frame relative to said lower seat frame;

a single piece wire bent to form a pair of axial aligned end portions for pivotal connection to the seat back frame for rotation about a first axis formed by said end portions, a central attachment portion between said end portions, said attachment portion being parallel to and radially offset from said end portions and a follower portion between said attachment portion and one of said end portions, said follower portion being parallel to and radially ofset from said end portions;

a lumbar support member pivotally coupled to said attachment portion; and a cam pivotally mounted to said seat back frame for rotation about a second axis parallel to said first axis and said cam having a surafce in continuous engagement with said follower portion and defining a plurality of stop portions located at progressively increasing radial distances from said second axis and means for rotating said cam about said second axis whereby said follower portion is rotated about said first axis defined by said end portions to rotate said bent wire and move said lumbar support member.

10. A vehicle seat assembly comprising:

a lower seat frame;

a seat back frame having spaced lateral sides, said seat back frame being pivotally mounted to said lower seat frame by a pivotal mount at a rear portion of said lower seat frame and extending generally upwardly therefrom, said pivotal mount enabling selective adjustment of said seat back frame to plural angular positions relative to said lower seat frame, and said seat back frame having a first generally upright member at one side of said seat back frame;

recliner means at one side of said seat assembly including a recliner brace pivotally coupled at a first end to said first upright member above the pivotal mount of said back frame to said lower frame, said brace extending downwardly and forwardly to a second end pivotally coupled to said lower seat frame and drive means for moving said second end fore and aft along said lower seat frame whereby said seat back frame pivots relative to said lower seat frame to adjust the angular position of said seat back frame relative to said lower seat frame;

said lower seat frame including a pair of fore and aft extending fixed rails adapted to be coupled to a vehicle floor with one rail disposed along each side of said seat assembly, a pair of fore and aft extending slide rails coupled to said fixed rails for fore and aft sliding motion with one slide rail along each side of said seat assembly, said fixed and slide rails each having lateral sides, and said slide rails having an upper support surface, said lower seat frame including a riser carried by each of said slide rails and extending upwardly from said slide rails, said seat back frame being pivotally mounted to said risers, each of said risers including a pair of plate members with one plate member attached to each side of said slide rails and extending upwardly above said slide rails; and said second end of said recliner brace being disposed between said riser plates and being pivotally coupled to said riser plates, said second end of said brace further being closely spaced above said support surface of one of said slide rails whereby loads applied to said seat back frame to rotate said seat back forward causing downward deflection of said recliner brace result in engagement of said recliner brace second end with said slide rail support surface.

11. A vehicle seat assembly having spaced lateral sides comprising:

a lower seat frame;

a seat back frame extending generally upwardly at a rear portion of said lower seat frame and being pivotally mounted to said lower seat frame by a pivotal mount, said seat back frame having a first generally upright member along one side of said seat back frame;

said lower seat frame including a pair of fore and aft extending fixed rails adapted to be coupled to a vehicle floor with one said fixed rail being disposed along each side of said seat assembly, a pair of fore and aft extending slide rails coupled to said fixed rails for fore and aft sliding motion with one said slide rail being disposed along each side of said seat assembly, said fixed rails each having an enlarged upper mounting portion upon which said slide rails are supported, said slide rails each having side walls extending downward over said enlarged mounting portions of said fixed rails and formed inwardly beneath said enlarged mounting portions to prevent vertical separation of said slide rails from said fixed rails;

a mounting plate attached to the fixed rail along said one side of said seat assembly, said mounting plate having a lower portion having means for attaching said mounting plate to a vehicle, and said mounting plate having an upper engaging portion vertically spaced above said lower portion; and a reinforcing plate mounted to said lower seat frame at the pivotal mount of said seat back frame to said lower seat frame and extending downwardly therefrom, said reinforcing plate having a captured lower end portion disposed beneath said upper engaging portion of said mounting plate, so that upward deflection of said reinforcing plate caused by loading of said pivotal mount during a vehicle collision results in engagement of said reinforcing plate with said mounting plate.

12. The seat assembly of claim 11 wherein the engaging portion of said mounting plate and the captured portion of said reinforcing plate are interconnected J-hooks.

13. The seat assembly of claim 11 further comprising a seat belt webbing having an end anchored to the pivotal mount of said seat back frame to said lower seat frame.

14. A vehicle seat assembly having spaced lateral sides comprising:

a lower seat frame;

a seat back frame extending generally upwardly at a rear portion of said lower seat frame;

said lower seat frame including a pair of fore and aft extending fixed rails adapted to be coupled to a vehicle floor with one said fixed rail being disposed along each side of said seat assembly, a pair of fore and aft extending slide rails coupled to said fixed rails for fore and aft sliding motion of said slide rails relative to said fixed rails between selected fore and aft positions, one said slide rail being disposed along each side of said seat assembly, said fixed rails each having an enlarged upper mounting portion upon which said slide rails are supported, said slide rails each having side walls extending downward over said enlarged mounting portions of said fixed rails and formed inwardly beneath said enlarged mounting portions to prevent vertical separation of said slide rails from said fixed rails;

an elongated latch bracket mounted to one of said fixed rails, said latch bracket having a portion spaced from said fixed rail with a plurality of apertures therein;

a latch pivotally carried by said slide rail mounted to said one fixed rail having teeth insertable into said apertures to fix the fore and aft position of the slide rails on said fixed rails; and a seat belt retractor mounted to said one slide rail through a mounting bracket, said mounting bracket having a hook portion disposed between said one fixed rail and said spaced portion of said latch bracket to resist separation of said retractor from said fixed rail.

15. A vehicle seat assembly comprising:

a lower seat frame, a seat back frame extending generally upwardly from said lower seat frame, and an adjustable lumbar support mechanism including:

a single piece wire bent to form a pair of axial aligned end portions for pivotal connection to the seat back frame for rotation about a first axis formed by said end portions, a central attachment portion between said end portions, said attachment portions being parallel to and radially offset from said end portions and a follower portion between said attachment portion and one end portion, said follower portion being parallel to and radially offset from said end portions;

a lumbar support member pivotally coupled to said attachment portion; and a cam pivotally mounted to said seat back frame for rotation about a second axis parallel to said first axis and said cam having a surface in continuous engagement with said follower portion and defining a plurality of stop portions located at progressively increasing radial distances from said second axis and means for rotating said cam about said second axis whereby said follower portion is rotated about the first axis defined by said end portions to rotate said ben wire and move said lumbar support member.

16. A frame for a vehicle seat assembly having spaced lateral sides comprising:

a pair of fore and aft extending fixed rails adapted to be coupled to a vehicle floor with one fixed rail disposed along each said lateral side of said seat assembly, a pair of fore and aft extending slide rails coupled to said fixed rails for fore and aft sliding motion with one slide rail along each side of said seat assembly, said fixed and slide rails each having lateral sides;

said fixed rails each having an enlarged upper mounting portion upon which said sliding rails are supported, said sliding rails each having side walls extending downward over the sides of said enlarged mounting portions of said fixed rails and formed inwardly beneath said enlarged mounting portions to prevent vertical separation of said slide rails from said fixed rails; and a riser carried by each of said slide rails and extending upwardly from said slide rails, said risers each including a pair of plate members with one plate member attached to each side of said slide rails and extending upwardly above said slide rails and also extending downwardly and being folded beneath said slide rails beneath said enlarged mounting portions of said fixed rails to reinforce said slide rails to prevent deformation of the slide rails caused by forces tending to vertically separate said slide rails from said fixed rails.

17. The seat frame of claim 16 further comprising:

means extending laterally through said riser plate members and said slide rails to prevent lateral separation of said plate members from said slide rails.

* * * * *

UNITED STATES PATENT AND TRADEMARK OFFICE
CERTIFICATE OF CORRECTION

PATENT NO. : 5,318,341

DATED : June 7, 1994

INVENTOR(S) : Les Griswold; Marc D. Hewko; Robert D. Elton; Paul M. Gripp and John Krieger It is certified that error appears in the above-indentified patent and that said Letters Patent is hereby corrected as shown below:

On the title page, item [22], delete "January 28, 1991" and insert —January 28, 1992—.

In Column 3, line 24, after "adjusted", kindly insert —positions of the—.

In Column 5, line 19, after "45" kindly insert —°—.

In Column 8, line 11, kindly delete "complicate" and insert —complicated—.

In Column 9, line 41, after "beam", delete "3" and insert —36—.

In Column 10, line 39, Claim 2, after "upright", kindly insert —member—.

In Column 12, line 20, Claim 9, after "position of", delete "asid" and insert —said—.

In Column 14, line 67, Claim 15, after "rotate said", delete "ben" and insert —bent—.

Signed and Sealed this

Fifteenth Day of November, 1994

Attest:

BRUCE LEHMAN

*Attesting Officer*     *Commissioner of Patents and Trademarks*